Figure 1:
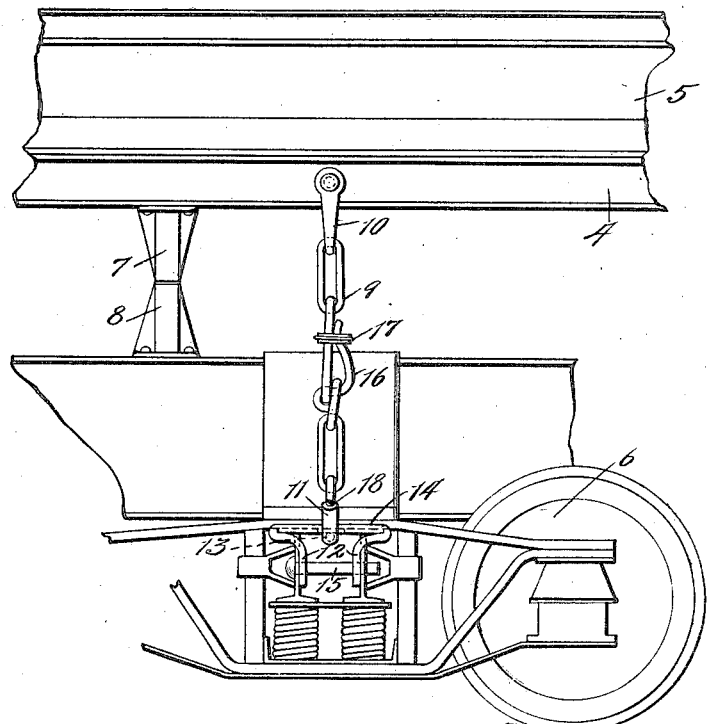

No. 888,188.

PATENTED MAY 19, 1908.

T. R. McKNIGHT.
DUMP CAR.
APPLICATION FILED JAN. 6, 1908.

Witnesses:

Inventor:
Thomas R. McKnight,

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

DUMP-CAR.

No. 888,188.　　　Specification of Letters Patent.　　　Patented May 19, 1908.

Application filed January 6, 1908. Serial No. 409,457.

*To all whom it may concern:*

Be it known that I, THOMAS R. MCKNIGHT, a citizen of the United States, residing at Aurora, in the county of Kane and State of Illinois, have invented certain new and useful Improvements in Dump-Cars, of which the following is a specification, reference being had to the accompanying drawings.

My invention relates to dump-cars, and has particularly to do with cars in which the car-body is pivotally supported so that it may be tilted to dump the load at either side of the car, and has for its object to provide improved means for holding the car-body in its horizontal or operative position while the car is being loaded or while it is in motion in transporting the load, so that provision may be made for the automatic adaptation of such means to movement of the parts when the car is rounding short curves. One form of device for this purpose is illustrated and described in my pending application, Serial No. 393,501, filed September 18, 1907. I accomplish this object as illustrated in the drawings and as hereinafter described.

What I regard as new is set forth in the claims.

Figures 2, 3:
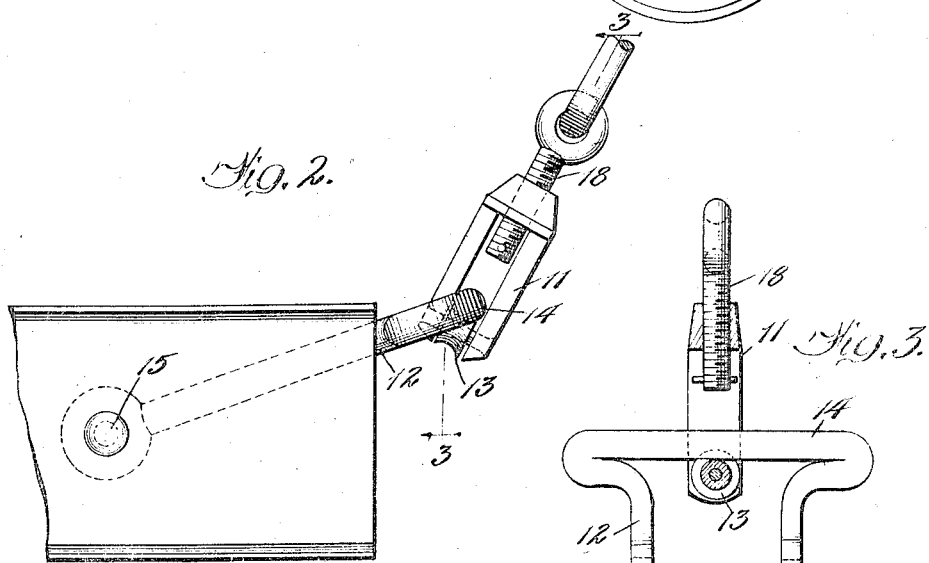

In the drawings,—Figure 1 is a partial side elevation of a dump car, illustrating my improvements; Fig. 2 is a detail, showing certain of the parts in edge view; and Fig. 3 is a sectional view on line 3—3 of Fig. 2.

Referring to the drawings,—4 indicates the car-body platform and 5 one of the side gates.

6 indicates one of the trucks,—in cars of this type there being usually two trucks, one near each end of the car-body.

7—8 indicate upper and lower members, which together pivotally support the car-body so that it may be tilted at either side of the car,—a pair of such supporting members, or other equivalent device, being preferably provided at intervals throughout the length of the car, in the usual way.

9 indicates a chain for holding the car-body in its normal position so as to prevent tilting thereof when loading or when the load is being transported. Two of such stay chains are provided at each side of the car,—the chains being placed opposite the sides of the trucks. In the construction shown the upper end of the chain is connected by a pivoted link 10 with the side of the car-body, as shown in Fig. 1, its lower end being connected with the truck so as to move longitudinally of the car by means of a swiveled yoke or coupling 11 which engages a swinging link 12. Said coupling is provided with a roller 13 which bears against the under side of the upper portion of the link 12, as best shown in Figs. 2 and 3, said link having a longitudinally-extending portion 14 at its upper end of suitable shape to bear upon said roller to form a way along which the roller may travel as the car-body and truck shift with relation to each other in rounding curves. The link 12 is pivotally connected by a pivot 15 with the truck, as shown in Figs. 1 and 2, so that it may rise and fall within certain limits, but it is in its uppermost position when in use, as shown in Fig. 2, at which time it bears against the upper portion of the truck or other stop conveniently arranged.

As best shown in Fig. 1, the chain 9 is provided with a hook 16, the end of which is secured by a ring 17 in the usual way so that the chain is separable intermediately to release the car-body and permit it to be dumped. By using a swiveled connection for the chain, as described, twisting strains are avoided, so that by this means in connection with the capacity for longitudinal movement secured by employing the longitudinal connection described the stay chains may readily accommodate themselves to the various strains to which the parts are subjected in rounding curves. The length of the chain may be adjusted by adjusting the bolt portion 18 of the swivel. It will be understood that instead of a chain any other flexible connection may be employed.

That which I claim as my invention, and desire to secure by Letters Patent, is,—

1. In a dump-car, the combination of a laterally-tilting car-body, a truck, a stay chain connected at its upper end with the car-body and at its lower end with the truck, the lower end of said chain being movable longitudinally of the car.

2. In a dump-car, the combination of a laterally-tilting car-body, a truck, a stay chain connected at its upper end with the car-body and having a swiveled connection at its lower end with the truck, the lower end of said chain being movable longitudinally of the car.

3. In a dump-car, the combination of a car-body, a truck, a chain connected at its upper end with the car-body, and a link pivotally connected with the truck, the lower end of said chain engaging said link and being movable thereon longitudinally of the car.

4. In a dump-car, the combination of a car-body, a truck, a chain connected at its upper end with the car-body, and a vertically-swinging link pivotally connected with the truck, the lower end of said chain engaging said link and being movable thereon longitudinally of the car.

THOMAS R. McKNIGHT.

Witnesses:
M. T. BABB,
E. H. BEREMAN.